Patented Mar. 27, 1934

1,952,642

UNITED STATES PATENT OFFICE 1,952,642

TANNING PREPARATIONS AND METHOD OF MAKING

Fredrick J. Wallace, Brooklyn, N. Y., assignor to Robeson Process Company, New York, N. Y., a corporation of New Jersey No Drawing. Application September 7, 1932, Serial No. 632,084

9 Claims. (Cl. 149—4)

This invention relates to tanning preparations and methods of making; and it comprises as a new material useful in tanning, a liquid containing the lignosulfonic and other acids of sulfite waste liquor, but low in "non-tans" and substantially free of carbohydrates fermentable by bacteria, such liquid usually being a thick acid preparation of about 30° Baumé; and it further comprises a method of making such a preparation wherein sulfite waste liquor is neutralized, inoculated with a bacterium capable of removing substantially all the reducing sugars present and of substantially lowering the furfural value, with production of volatile liquids, fermentation is instituted, usually with the addition of nitrogenous nutrifying material and an adjustment control of the pH value, the residual neutral liquid is evaporated, usually under a vacuum, to a suitable consistency, usually 30-33° Baumé, the volatile materials being often recovered during evaporation, and the lime in the concentrated liquor is precipitated as an insoluble salt, usually with sulfuric acid; all as more fully hereinafter set forth and as claimed.

In the manufacture of sulfite pulp, wood is digested with a solution of acid sulfite of lime. About half the wood remains undissolved as cellulose and the remaining half goes into solution, forming what is known as sulfite waste liquor. This is usually a slightly acid liquid containing about 8 to 10 per cent of total solids. It contains certain characteristic bodies derived from the lignin of the wood and usually called lignosulfonic acids; these acids occurring as lime salts. It also contains a large amount of extractive matter from the wood; all the water-soluble matter and also the solubles formed by hydrolysis from the various indefinite carbohydrate constituents of wood. Some of these constituents are what are known as pentosans and the liquid contains pentose sugars. The liquid also contains some sugars which can be fermented by yeast and are probably hexoses.

In the art, sulfite liquor is often neutralized with lime and evaporated down to a concentrated liquid of about 30° Baumé, carrying about 50 per cent total solids. This is used as an adhesive and binder, as in making sand cores, consolidating road surfaces, etc. From this neutral, concentrated liquid are made various preparations useful in tanneries; the usual method being to precipitate the lime with sulfuric acid, forming insoluble calcium sulfate. Where this is done, the weak liquor is usually first concentrated to about 33° Baumé. After the sulfuric acid treatment, a liquid of standard strength, 30° Baumé, is then obtained.

Tanning preparations made as described are useful in the art and find a large sale. In them, however, the active constituent is really the lignosulfonic acids, and the carbohydrates, such as the pentosans, pentoses, hexoses, etc., form an undesirable ballast. They are non-tans. A reduction in the amount of these non-tans is desirable.

In the prior art, sulfite liquor has been fermented with yeast to produce alcohol, but the various commercial attempts have not proved profitable in this country since the fermented material is too poor in alcohol to make its recovery economical. At the most the light liquor will show about 1.8 to 2 per cent reducing sugar as determined with Fehling solution and calculated to dextrose. Not much more than half this sugar is really hexose or fermentable with yeast. Good yeast fermentation of a 2 per cent liquor will usually give a fermented liquor still containing 0.8 to 0.9 per cent reducing sugar. Yeast fermentation of sulfite liquor is not worth while for the sake of the alcohol and experience has shown that the fermented liquor does not have sufficiently bettered tanning properties to justify fermentation.

I have found, however, that by inoculating sulfite liquor with certain bacterial cultures, I can rapidly produce a product which is of high value as a tanning agent. I have found that by the use of properly selected, cultivated and acclimated bacteria, I can convert not only the hexose sugars but other carbohydrates into volatile liquids which can be, and are, distilled off, leaving a residual liquor carrying a greater proportion of the valuable tanning bodies. The conversion extends much further than it can be carried by yeast. In practice, the liquor is fermented and is afterwards evaporated in the usual multiple effect vacuum pans. The volatile liquids from the fermentation are vaporized in the first effect. If it is desirable to recover them this can be done by redistillation of the condensed water from the second effect. Sometimes this recovery is worth while and sometimes not. In this method I produce a fermented liquor which can be evaporated down or concentrated and treated with sulfuric acid to produce an acid liquid of greatly increased tanning value as compared with similar preparations made from the unfermented liquid. It is possible that the improved tanning results are in part due to the fermentation and removal of particular carbohydrate materials detrimental in tanning. In part, they are, however, due to a better purity; to a removal of undesirable non-tans.

There are many types of bacteria capable of fermenting carbohydrates; their fermenting power varying widely as regards different carbohydrates. In general, however, their activity is greater than that of yeasts which are only capable of fermenting hexose carbohydrates. In my process I employ bacteria capable of fermenting pentoses and pentosans, as well as hexoses. Sulfite liquor contains pentoses and pentosans. The former are reducing sugars. By my bacterial fermentation I remove a large part of the pentosans which do not react with Fehling solution. Pentosans and pentoses, on distillation with hydrochloric acid, give a distillate of furfural and the furfural number of sulfite waste liquor is an index of the amount of pentosans and pentoses present. The methods of determining the furfural number now in use are not particularly accurate but they are more or less indicative. After fermentation of the liquor with the bacteria, the furfural number is lessened; this lessening being due in part to the removal of pentose sugars, but in part also to the removal of pentosans. By removing pentosans and pentoses, as well as hexoses, the sulfite liquor, considered as a tanning agent, is much improved. Whatever the underlying reason, the fact is that tanning agents produced by fermenting sulfite waste liquor using bacteria capable of fermenting all the reducing sugars and of substantially lowering the furfural value, are greatly superior for tanning purposes.

Where pentosans, pentoses and hexoses are fermented and converted into volatile liquids and these volatile liquids removed, the ratio of tans to non-tans is increased. This is done in the present invention. The percentage of total solids in a tanning solution represented by the tanning components is known in the tanning art as the "purity".

In the present invention I make tanning agents of greater purity, employing bacteria of the class described: those which convert carbohydrates into volatile products, such as ethyl alcohol, acetone, butyl alcohol, etc. After fermentation these are removed by distillation and concentrated tanning preparations are made. It is possible to improve bettered tanning preparations by converting pentosans, pentoses and hexoses into a non-volatile product, namely, lactic acid. An addition of lactic acid to the tanning acids already present in sulfite liquor is advantageous. In another and copending application, Serial No. 632,085, I have described and claimed processes wherein lactic acid is produced. In the present application, however, I look more particularly to the use of bacteria which will enable me to lower the total solid content of the liquor, subtracting non-tans; those bacteria which will produce, at the expense of the carbohydrate non-tans, volatile liquids which can be distilled off and removed. These volatile liquids may be recovered to form a valuable by-product or may be simply discarded.

There are various commercial cultures of bacteria which can be used as starting materials for my purposes. In and of themselves, however, these commercial preparations are not directly applicable, since the organisms require acclimation and adaptation to sulfite liquor. Most of the commercial cultures are propagated in cultures containing hexose carbohydrates, such as glucose, as the nutrient material and they require adaptation to fit them for fermentation of pentoses and pentosans. So to speak, their pentosan fermenting power is latent. Among the commercially well known species which can be used as starting materials for my purposes are *Aero bacillus, aceto-ethylicum, Bacillus macerans, Clostridium acetonigenum, Bacillus butylicus* and *Bacillus butyricum*. *Bacillus butylicus* and *Bacillus aceto-ethylicum* are highly desirable organisms. The latter produces acetone and alcohol. *Bacillus macerans* produces the same products with a somewhat larger proportion of alcohol. *Clostridium acetonigenum* (*Bacillus granulobacter pectinovorum*) and *Bacillus butylicus* are also useful in my process, the former producing mostly acetone and the latter, acetone with some butyl alcohol. All, however, subtract a large proportion of the total solids from the sulfite liquor and convert them into volatile bodies which can be removed. All can reduce the reducing sugars as shown by Fehling solution to zero; they all remove not only the hexoses but the reducing pentoses as well as pentosans.

In acclimating commercial cultures of these organisms for my purposes, I grow successive cultures in liquid media containing sulfite waste liquor, using no hexose sugar. In this cultivation the organisms undergo profound changes, morphologically and otherwise. The organisms finally developed and used in fermenting do not, in general, much resemble the original bacteria.

In even the purest forms of commercial cultures, I find that some individual cells are better adapted for my purposes than others. I therefore generally plate or otherwise isolate individual organisms from the commercial culture. A number of flasks containing sulfite liquor are then prepared, each is inoculated from an individual colony and the inoculated liquid is allowed to ferment. The liquid medium may be made by dissolving a little beef peptone or other nitrogenous material in sulfite waste liquor and adding sufficient calcium carbonate to make the liquid neutral. After two or three days standing, the flasks will display individual differences; the sulfite liquor fermenting better in some than in others. The efficiency of the fermentation can be estimated by a furfural determination on the fermented liquor; but it is usually simpler to employ Fehling solution. Total disappearance of reducing sugars is always coupled with a substantial removal of impurities not reducing to Fehling solution. In another way of examination, an alcohol or acetone determination may be made. This is a direct index of the extent to which fermentation has gone forward. Another series of flasks may be directly inoculated from the culture showing the highest efficiency but I often find it expedient to re-plate from the best culture, inoculating the flasks from individual colonies. Repetitions of this operation, in general, give cultures energetically fermenting the pentoses and pentosans of sulfite waste liquor.

An efficient bacterium should be capable of completely, or substantially completely, removing all the reducing sugars in a short period of time and of making a substantial reduction in the furfural number of the sulfite liquor. In one particular case, a sulfite waste liquor before fermentation showed a reducing sugar content of 2 per cent and its furfural value was 0.24 per cent. After fermentation with *Bacillus butylicus* the resulting liquor gave a reducing sugar content of 0.25 per cent, while the furfural value was reduced to 0.05 per cent.

In commercial practice, portions of the fermented light liquor are usually employed for reculturing a succeeding batch. A 50-gallon portion of fermented liquid is usually sufficient to inoculate 5000 gallons of light liquor. If marble chips are allowed to remain in the fermenting tank, these usually retain an appreciable quantity of bacteria which assist in inoculating a fresh batch of liquor.

In one particular operation which may be used to illustrate a practical embodiment of my process, I took ten thousand gallons of hot raw light liquor as received from the blow pits. This was neutralized with calcite lime sufficient to bring the pH value to 7.5. The neutralized liquor was settled and then run into a fermenting tank, in the bottom of which marble chips were placed. The liquor was cooled to 100° F. and inoculated with a culture obtained from *Clostridium acetonigenum*.

After the fermenting tank was inoculated, a small amount of malt sprouts (0.4 per cent by weight of the light liquor) was added. The temperature was kept at about 100° F. Additions of small amounts of calcium carbonate or calcite lime were made to keep the pH value at about 7.5. Variation of the pH between, say, 6.5 and 8.5 were permissible. When fermentation was complete, which in this case was within three days, the liquor was evaporated in vacuum to a concentration of 34° Baumé. Evaporation was conducted in a multiple effect evaporating pan and the condensate drawn from the heating elements of the second pan was collected and redistilled to recover alcohol and acetone.

The concentrated 34° Baumé liquid from the multiple effect was treated with sulfuric acid, the amount added being that necessary to throw down the lime and being determined by analysis. After acidification, the concentrated extract was filtered and was then ready for marketing. Its final gravity was approximately 30° Baumé.

The volatile liquids formed in fermentation usually contain more or less alcohol. Acetone is often a large constituent. These volatile liquids can be collected and are valuable, but when this is done they are merely by-products in the present operation; the main object of which is to produce improved tanning liquids free of much of the usual carbohydrate ballast.

In another specific embodiment of my invention, a light liquor was neutralized as described above, was then inoculated with a culture developed from *Bacillus macerans* and was allowed to ferment until removal of the sugars was substantially complete. The progress of the operation was followed by determining reducing sugars with ordinary Fehling solution. The liquor was then evaporated and treated as previously described.

The other bacteria mentioned ante may be used in a similar manner, with only minor changes in procedure. These changes are usually adjustment of pH and temperature to the values known to promote fermentation with the particular cultures involved.

In order to show the greatly improved qualities of the tanning preparations made in accordance with my invention, I have listed in the following table, analyses of several liquors prepared after fermenting sulfite waste liquor by means of the bacteria indicated. The values in the first column are those of a tanning extract made from neutralized light liquor without fermentation, but concentrating and acidifying as described.

|  | Tanning extract unfermented | Fermented with *Aerobacillus acetoethylicum* | Fermented with *Bacillus macerans* | Fermented with *Bacillus butylicus* | Fermented with *Clostridium butyricum* |
|---|---|---|---|---|---|
| Be | 30.30° | 30.0° | 30.0° | 28.5° | 30.1° |
| Ash | 3.04% | 2.70% | 2.95% | 3.19% | 2.77% |
| Fe | 0.011% | 0.011% | 0.011% | 0.005% | 0.008% |
| CaO | 0.23% | 0.14% | 0.15% | 0.25% | 0.16% |
| MgO | 2.10% | 2.24% | 1.88% | 1.99% | 2.27% |
| Total solids | 52.13% | 50.88% | 52.13% | 49.83% | 52.66% |
| Non-tans | 25.51% | 22.42% | 17.57% | 18.31% | 24.88% |
| Tannin | 26.62% | 28.46% | 34.56% | 31.52% | 27.78% |
| Acetic acid | 3.80% | 7.10% | 5.39% | 10.30% | 5.2% |
| Reducing sugars | 13.45% |  | 3.30% | .40% | 2.48% |
| Purity | 51.0 | 55.9 | 66.3 | 63.2 | 52.7 |

It will be noted that in the liquor resulting after fermentation the reducing sugars have been eliminated, while the other constituents have been correspondingly increased. Part of the increase in "acetic acid" is due to bacterial action on the alcohol.

Tanning extracts prepared in the manner described above have good tanning qualities. They are greatly superior to similar products produced either from unfermented or from yeast fermented sulfite waste liquors. The new extracts can be employed as general tanning agents. When used in the finished stages in the manufacture of sole leather, in the dry dipping step, for example, they produce a leather of uniform hardness, regardless of whether the operation is conducted in warm or in cold weather. The new extracts are capable of tanning hides to produce leather without the aid of other extracts. They may be used in the rocker, layer or yard systems of a tannery. In the rocker system they can be used until they are substantially completely exhausted. This is a new result. The finished leathers produced with my new extracts possess a fine-grained hide structure and a much better color. They have a desirable softness and a high strength. The plumpness of the leather is excellent. They also have the advantage of being sterile and resistant to further fermentation. By their use the tanner is enabled to eliminate the usual acid formers in the yard such as wattle, valonia or myrobolans. These acid formers cause fermentations with losses sometimes as high as 25 per cent of the original tannin present. The preparations of the present invention supply all desired acidity and cause no loss in tannin.

What I claim is:

1. As an improved tanning preparation, a liquid containing characteristic solids of sulfite waste liquor, including lignosulfonic acid, and having a negligible content of pentoses and hexoses.

2. As an improved tanning preparation, a liquid containing characteristic solids of sulfite waste liquor, including lignosulfonic acid, but being substantially free of carbohydrate material fermentable by bacteria capable of fermenting such carbohydrate materials to volatile liquids.

3. As an improved tanning preparation, a liquid containing characteristic solids of sulfite waste liquor, including lignosulfonic and other acids, but being substantially free of carbohydrate material fermentable by bacteria.

4. In the manufacture of tanning preparations, the step which comprises fermenting sulfite waste liquor with bacteria capable of removing substantially all the reducing sugars present.

5. In the manufacture of tanning preparations, the process which comprises neutralizing sulfite waste liquor, inoculating with bacteria capable of removing substantially all the reducing sugars present, permitting fermentation to take place and controlling the fermentation in such a manner as to convert said reducing sugars into volatile products, and concentrating the fermented liquor.

6. In the manufacture of tanning preparations, the process which comprises neutralizing sulfite waste liquor, inoculating with bacteria capable of removing substantially all the reducing sugars present with production of volatile liquids, allowing fermentation to take place, removing the volatiles, concentrating the fermented liquor and removing calcium.

7. In the manufacture of tanning preparations, the step which comprises fermenting sulfite waste liquor with a bacterium capable of fermenting pentosans and pentoses.

8. In the manufacture of tanning preparations, the process which comprises acclimating to sulfite waste liquor a bacterium capable of fermenting pentosans and pentoses, inoculating sulfite waste liquor with the so-acclimated bacterium and allowing fermentation to take place.

9. In the manufacture of tanning preparations, the process which comprises neutralizing sulfite waste liquor, inoculating with an acclimated bacterium capable of fermenting pentosans and pentoses with production of volatile liquids, allowing fermentation to take place, concentrating the fermented liquor and recovering the volatiles.

FREDRICK J. WALLACE.